US006549938B1

(12) United States Patent
Kilkki et al.

(10) Patent No.: US 6,549,938 B1
(45) Date of Patent: Apr. 15, 2003

(54) SYSTEM AND METHOD FOR PRIORITIZING MULTICAST PACKETS IN A NETWORK SERVICE CLASS UTILIZING A PRIORITY-BASED QUALITY OF SERVICE

(75) Inventors: Matti Kalevi Kilkki, Lexington, MA (US); Jussi Pekka Olavi Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/209,182

(22) Filed: Dec. 10, 1998

(51) Int. Cl.$^7$ ............................................... G06F 15/16
(52) U.S. Cl. ..................... 709/207; 709/204; 709/223; 709/234; 709/235; 709/222; 709/249; 370/17; 370/60; 370/92; 370/230; 370/252; 370/389; 370/465
(58) Field of Search ................................. 709/207, 235, 709/223, 253, 234, 222, 204, 249; 370/92, 17, 60, 252, 230, 465, 389, 256; 710/129

(56) References Cited

U.S. PATENT DOCUMENTS

| | | | | |
|---|---|---|---|---|
| 5,153,877 A | * | 10/1992 | Esaki et al. | 370/94.1 |
| 5,276,681 A | * | 1/1994 | Tobagi et al. | 370/229 |
| 5,287,347 A | * | 2/1994 | Spanke | 370/60 |
| 5,351,243 A | * | 9/1994 | Kalkunte et al. | 370/92 |
| 5,410,585 A | | 4/1995 | Kawaharata | |
| 5,521,971 A | * | 5/1996 | Key et al. | 379/220 |
| 5,541,913 A | | 7/1996 | Witters et al. | |
| 5,548,581 A | * | 8/1996 | Makrucki | 370/17 |
| 5,548,796 A | * | 8/1996 | Ketchum | 710/52 |
| 5,557,608 A | | 9/1996 | Calvignac et al. | |

(List continued on next page.)

OTHER PUBLICATIONS

Scoping Multicasts in Wan Interconnected Local Networks; IBMTDBD, vol. No. 34, issue 8, pp. 68–71; Jan. 1992.*

B. L. Mark, et al., *Large Capacity Multiclass ATM Core Switch Architecture*, ISS World Telecommunications Congress, CA Toronto, Pinnacle Group, 1997, pp. 417–423.

J. Ruutu, et al., *Simple Integrated Media Access–A Comprehensive Service for Future Internet*, Performance of Information and Communication Systems. Proceedings of Seventh International Conference on Performance of Information, pp. 321–332, 1998, London, UK Chapman & Hall.

"Traffic Control and Congestion Control in B–ISDN", *ITU–T Recommendation 1.371*, pp. 1–27 (Mar. 1993).

"ATM Service Categories: The Benefits to the User", http://www.atmforum.com/atmforum/service_categories.html, last updated Aug. 22, 1996, pp. 1–10.

"What are the Meaning of CBR, VBR, ABR, UBR?", http://cell–relay.indiana.edu/cell–relay/FAQ/ATM–FAQ/d/d19.htm, last updated Aug. 20, 1996, pp. 1–2.

"ATM Lecture", http://syllabus.syr.edu/Ist/Mweschen/Ist656/Week4/lecture/atm/atm.htm, pp. 1–5.

"Traffic Management Specification Version 4.0", *ATM Forum Technical Committee*, pp. 1–59 (Apr. 1996).

Primary Examiner—Ayaz Sheikh
Assistant Examiner—Frantz B. Jean
(74) Attorney, Agent, or Firm—Squire, Sanders & Dempsey, L.L.P.

(57) ABSTRACT

A system and method for achieving a comparable quality of service for each of the receivers of a multicast transmission incorporating a priority-based quality of service is provided. Packet acceptance criteria established at each individual connection of a network node is overridden to provide a collective packet acceptance criteria for each packet of a multicast transmission targeted for the individual connections. The packet acceptance criteria is collected from each of the individual connections in the network node that are targeted for the multicast transmission. A multicast packet priority is calculated for each of the packets associated with the multicast transmission based on an aggregate analysis of the packet acceptance criteria of each of the individual connections. Each of the packets associated with the multicast transmission is collectively accepted or discarded based on the calculated multicast packet priority.

13 Claims, 13 Drawing Sheets

U.S. PATENT DOCUMENTS

| | | | |
|---|---|---|---|
| 5,600,641 A | | 2/1997 | Duault et al. |
| 5,634,015 A | * | 5/1997 | Chang et al. ............... 710/129 |
| 5,708,660 A | | 1/1998 | Riedel |
| 5,748,615 A | | 5/1998 | Riedel et al. |
| 5,754,764 A | * | 5/1998 | Davis et al. ........... 395/200.01 |
| 5,757,784 A | | 5/1998 | Liebowitz et al. |
| 5,768,521 A | | 6/1998 | Dedrick |
| 5,768,627 A | | 6/1998 | Jones et al. |
| 5,784,358 A | * | 7/1998 | Smith et al. ................ 370/230 |
| 5,790,522 A | | 8/1998 | Fichou et al. |
| 5,805,577 A | | 9/1998 | Jain et al. |
| 5,805,585 A | | 9/1998 | Javitt et al. |
| 5,812,527 A | | 9/1998 | Kline et al. |
| 5,818,818 A | | 10/1998 | Soumiya et al. |
| 5,828,653 A | | 10/1998 | Goss |
| 5,838,922 A | | 11/1998 | Galand et al. |
| 5,870,386 A | * | 2/1999 | Perlman et al. ............. 370/256 |
| 5,991,272 A | * | 11/1999 | Key et al. ................... 370/252 |
| 6,014,695 A | * | 1/2000 | Yamashita et al. .......... 709/219 |
| 6,038,230 A | * | 3/2000 | Ofek .......................... 370/389 |
| 6,049,826 A | * | 4/2000 | Beser ......................... 709/222 |
| 6,081,505 A | * | 6/2000 | Kilkki ........................ 370/230 |
| 6,085,238 A | * | 7/2000 | Yuasa et al. ................ 709/223 |
| 6,098,110 A | * | 8/2000 | Witkowski et al. ......... 709/249 |
| 6,101,554 A | * | 8/2000 | Creedon et al. ............ 709/253 |
| 6,115,749 A | * | 9/2000 | Golestani et al. ........... 709/235 |
| 6,141,355 A | * | 10/2000 | Palmer et al. .............. 370/465 |
| 6,145,109 A | * | 11/2000 | Schuster et al. ............ 714/752 |
| 6,170,075 B1 | * | 1/2001 | Schuster et al. ............ 714/776 |
| 6,173,314 B1 | * | 1/2001 | Kurashima et al. ......... 709/204 |
| 6,247,058 B1 | * | 6/2001 | Miller et al. ................ 709/234 |

* cited by examiner

SYSTEM AND METHOD FOR PRIORITIZING MULTICAST PACKETS IN A NETWORK SERVICE CLASS UTILIZING A PRIORITY-BASED QUALITY OF SERVICE

FIELD OF THE INVENTION

The present invention relates generally to network communications systems, and more particularly, to a method and apparatus for providing packet acceptance and rejection determinations on a multi-user basis, for multicast transmissions implementing a priority-based quality of service.

BACKGROUND OF THE INVENTION

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Notwithstanding the complexity of conventional ATM traffic management schemes, current ATM specifications and recommendations fail to adequately address the need of service providers for a methodology that provides for accurate and reliable charging of services utilized by user's of the network. Even if one were to assume that a charging scheme that accounts for most or all of the currently defined ATM traffic management properties could be developed, such a scheme would necessarily be complex and would typically require administration by highly skilled operators. The high overhead and maintenance costs to support such a billing scheme would likely be passed on to the network provider and, ultimately, to the network user.

The present invention is applicable in a network service class which incorporates a priority-based quality of service. This service class, hereinafter referred to as the Simple Integrated Media Access (SIMA) service class, provides a network management architecture that is simple in concept and in its implementation, yet adequately addresses the quality of service requirements to support a variety of network services, including real-time and non-real-time services. It also provides for the implementation of a simple and effective charging capability that accounts for the use of network services.

However, with the use of such a priority-based quality of service scheme, all packets are handled separately, such that each incoming packet to a core network node is individually analyzed for its priority, or alternatively, its drop preference. This, as is described more fully below, may be unacceptable in multicast situations.

Multicasting is the transmission of packets from one source to multiple receivers or users. For example, in a video broadcasting application, the server sends the same picture to every client. A problem is that that a priority-based QoS such as implemented in SIMA can lead to quite different quality of service at each of the different branches of the multicast transmission. While this may be acceptable in many situations, there are situations where it is preferable to guarantee a similar quality of service to all receivers of the multicast transmission. For example, a server providing video multicast may want to ensure that all of its clients receive a video picture that has an approximately constant quality regardless of the location of the receiving user.

Accordingly, there is a need for a system and method for providing packet acceptance and rejection determinations on a multi-user basis, for multicast transmissions implementing a priority-based quality of service. The present invention provides for a similar quality of service for all receivers of the multicast transmission, and therefore overcomes this and other shortcomings of the prior art, and offers additional advantages over the prior art.

SUMMARY OF THE INVENTION

The present invention is directed to a system and method for achieving a comparable quality of service for each of the receivers of a multicast transmission incorporating a priority-based quality of service.

In accordance with one embodiment of the invention, a method is provided for overriding packet acceptance criteria established at each individual connection of a network node, to provide a collective packet acceptance criteria for each packet of a multicast transmission targeted for the individual connections. The packet acceptance criteria is collected from each of the individual connections in the network node that are targeted for the multicast transmission. A multicast packet priority is calculated for each of the packets associated with the multicast transmission based on an aggregate analysis of the packet acceptance criteria of each of the individual connections. Each of the packets associated with the multicast transmission is collectively accepted or discarded based on the calculated multicast packet priority.

In accordance with another embodiment of the invention, a method is provided for overriding packet acceptance criteria established at each individual connection of a network node, to provide a collective packet acceptance criteria for each packet of a multicast transmission targeted for the individual connections. The packet acceptance criteria is collected from each of the individual connections in the network node that are targeted for the multicast transmission. A multicast packet priority is calculated for each of the packets associated with the multicast transmission based on an aggregate analysis of the packet acceptance criteria of each of the individual connections. The packet acceptance criteria from each of the connections in the network node is modified based on the calculated multicast packet priority. Each of the packets associated with the multicast transmission is individually accepted or discarded based on the modified packet acceptance criteria.

In accordance with another aspect of the invention, a system is provided for distributing multicast packets to a plurality of destinations in a network having at least one node between the source and the plurality of destinations, where either virtual or real connections are established between the source and each of the plurality of destinations to provide a multicast transmission of the multicast packets. The system includes a plurality of packet scheduling modules, one for each connection at the node. Each packet scheduling module accepts and discards packets based on an allowable packet priority of its corresponding connection. The system further includes a multicast priority management module coupled to each of the plurality of packet scheduling modules to receive the corresponding allowable packet priorities. Using these allowable packet priorities, the multicast packets destined for the destinations are collectively accepted or discarded based on the aggregate node priority derived from the allowable packet priorities of each of the packet scheduling modules.

In accordance with yet another embodiment of the invention, a system for equalizing the quality of service provided in a priority-based network service class is provided. The system includes a multicast transmission source and a plurality of multicast packet receivers. Within the network is at least one node that coupled the multicast transmission source and the plurality of multicast packet receivers. The node includes a router to route the multicast packets to their corresponding multicast packet receivers via a plurality of connections between the multicast transmission source and the plurality of multicast packet receivers. A plurality of packet scheduling modules are provided, one for each connection at the node. Each packet scheduling module accepts and discards packets based on an allowable packet priority of its corresponding connection. The system further includes a multicast priority management module coupled to each of the plurality of packet scheduling modules to receive the corresponding allowable packet priorities, and to collectively accept and discard the multicast packets destined for the plurality of multicast packet receivers based on an aggregate node priority derived from the allowable packet priorities of each of the packet scheduling modules.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made, without departing from the scope of the invention.

The present invention is directed to a system and method for accepting and discarding multicast transmission packets in a network service class implementing a priority-based quality of service. Each of the core network nodes make multicast packet acceptance decisions prior to delivery of the multicast packets to their individual switched connections. This collective packet acceptance function allows a similar quality of service to be provided for all receivers of the multicast transmission, even where individual connections of the multicast transmission might otherwise be configured to provide a diverse quality of service among the different connections and ultimate users.

A network implemented in accordance with the principles of the present invention provides a priority-based quality of service, such as with the SIMA service class that incorporates a nominal bit rate (NBR). While the multicast method and system according to the present invention may be applicable to different conventional network switching systems, an appreciation of the principles of the invention is best obtained in the context of the following diagrams, in which a SIMA network service class is shown and described in accordance with the present invention.

The realization and benefits of a SIMA network may be determined in a manner described herein and in copending U.S. patent application, Ser. No. 08/821,273 entitled "Nominal Bit Rate Network Service", filed on Mar. 20, 1997, which is assigned to the assignee of the instant application, the contents of which are incorporated herein by reference. However, to obtain an understanding of a network incorporating a SIMA service class, the SIMA nominal bit rate (NBR) concept is described generally below.

Figure 1:
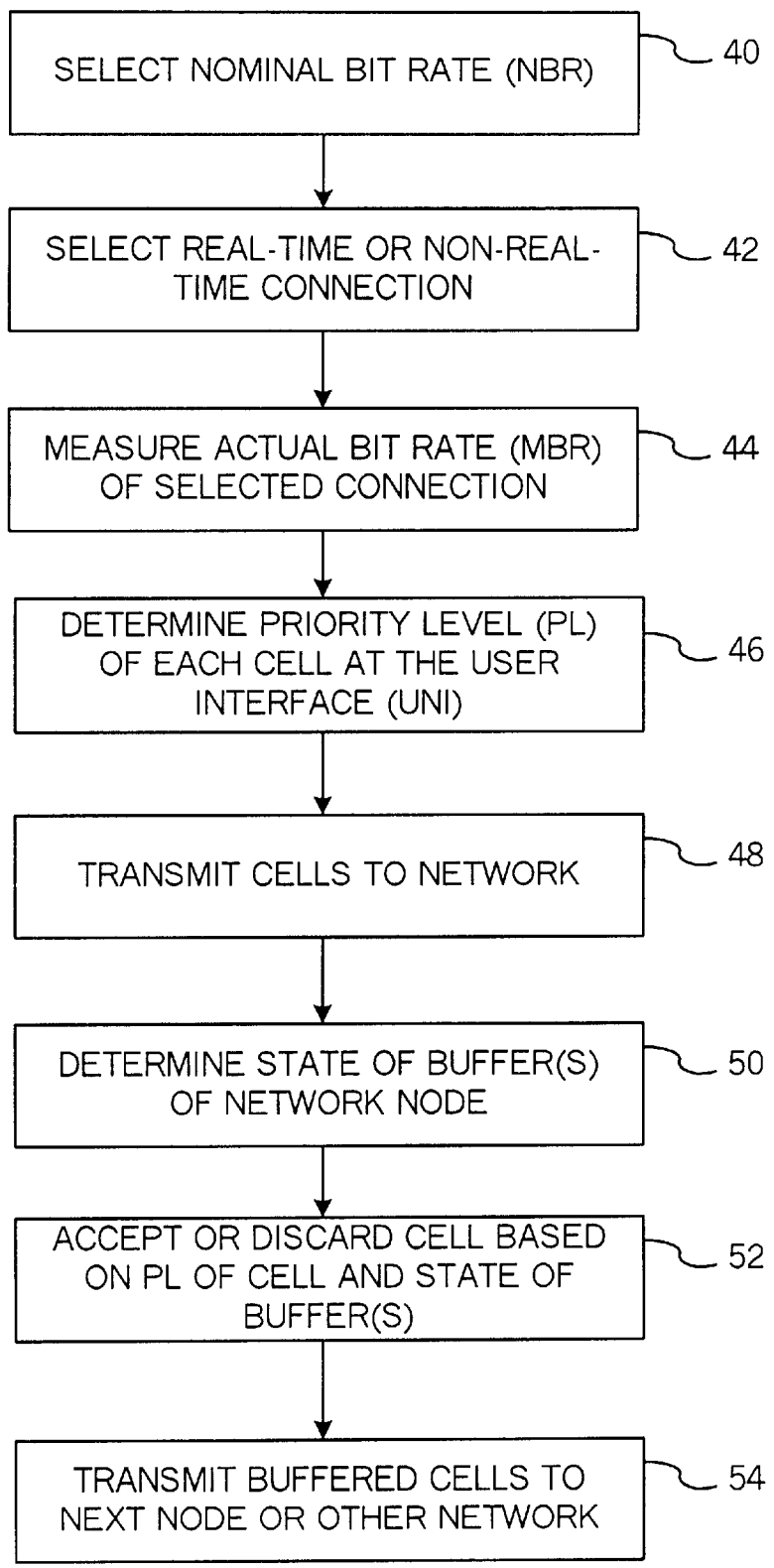
FIG. 1 is a flow diagram illustrating a general procedure for communicating cells of information between a user/network interface and a network using a nominal bit rate service in accordance with the present invention.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI. In one embodiment of the invention, a ratio of the MBR and the NBR is used to determine 46 the PL.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
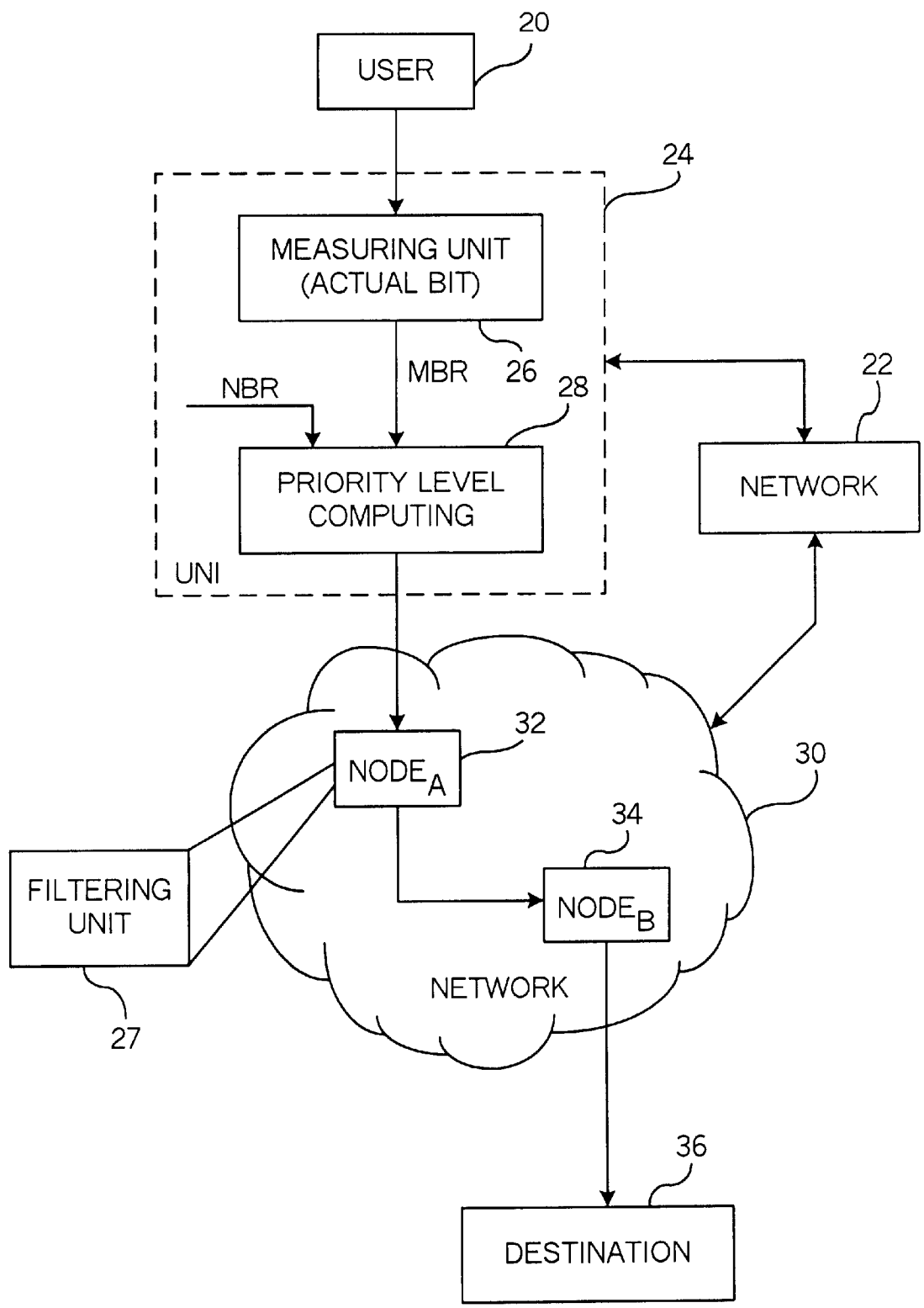
FIG. 2 is a system block diagram of a nominal bit rate service architecture in accordance with the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as node$_A$ 32. The node$_A$ 32 accepts or discards the cell received from the UNI 24 based on the priority level of the cell and the buffering capacity of node$_A$ 32. In general, as the occupancy of the buffer or memory of node$_A$ 32 increases (i.e., becomes more filled), cells having a lower priority (i.e., higher priority level value) are discarded in favor of accepting cells having a higher priority (i.e., lower priority level value). As the occupancy level of the buffer of node$_A$ 32 decreases (i.e., becomes less filled), the node$_A$ 32 becomes increasingly tolerant toward accepting cells of lower priority (i.e., higher priority level values). Cells that are buffered in node$_A$ 32 are subsequently transmitted to another node in the network 30, such as node$_B$ 34, or other network and, ultimately, to an end-destination 36.

The exemplary network 30 used for purposes of this description is depicted as a network having two intermediary nodes 32 and 34. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 3:
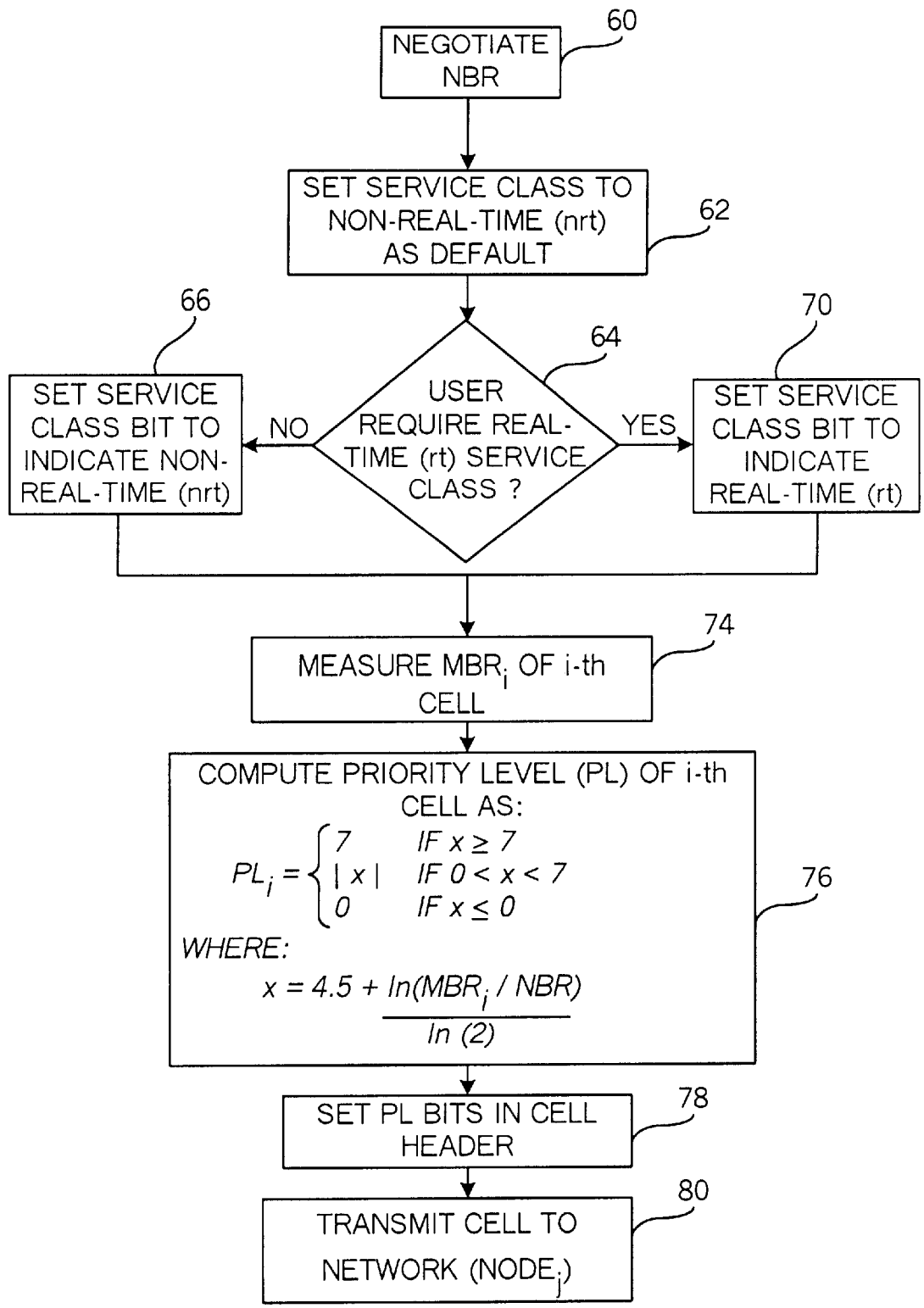
FIG. 3 illustrates in greater detail a procedure for transmitting cells of information between a user/network interface and a network using a nominal bit rate service in accordance with the present invention.
Figure 4:
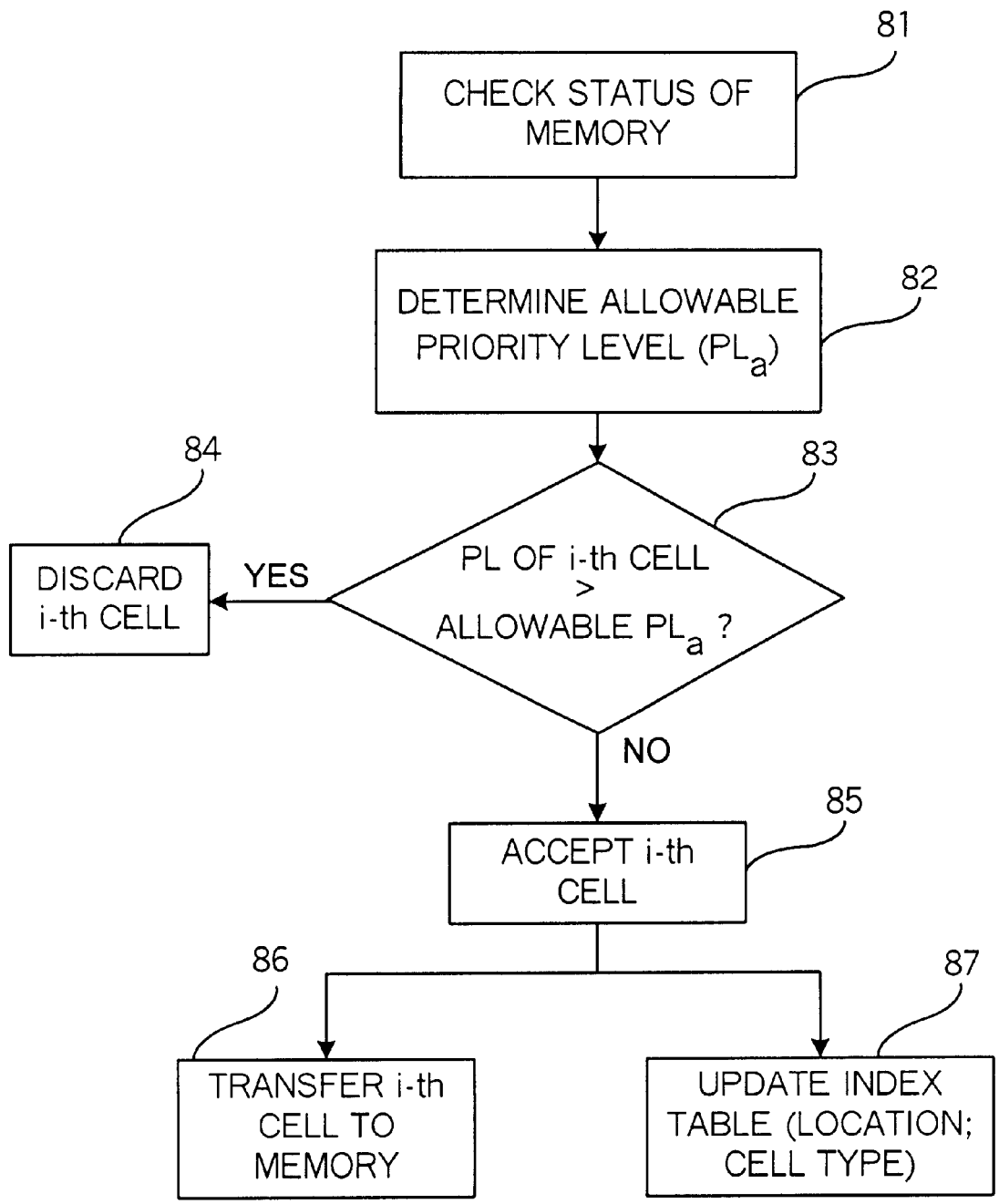
FIG. 4 illustrates in flow diagram form a general procedure for filtering cells at a network node in a nominal bit rate service.
Figure 5:
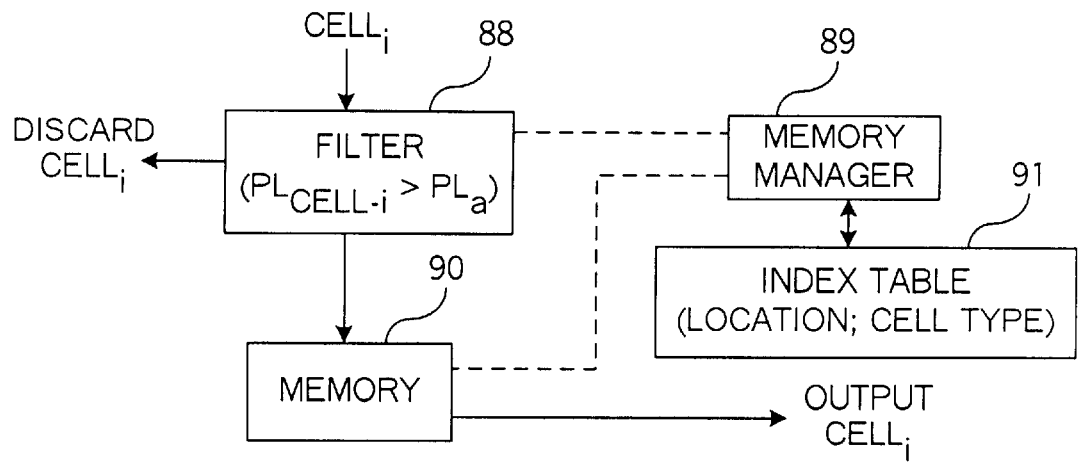
FIG. 5 is a block diagram of an embodiment of a system for filtering cells at a network node in accordance with a nominal bit rate service.

FIGS. 3–5 illustrate a procedure for scheduling and buffering cells in accordance with one embodiment of an NBR service methodology. Referring now to FIG. 3, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, MBR$_i$.

In general, the UNI measures 74 the actual bit rate of a cell, such as cell$_i$, by approximating the actual or instantaneous bit rate of the connection within a measuring period having a duration that is appropriate for the particular connection (e.g., a real-time or non-real-time connection). The present invention provides for the measurement of the instantaneous bit rate, MBR$_i$.

Having determined 74 the measured bit rate, MBR$_i$, of the i:th cell, the priority level of the i:th cell is computed using the measured bit rate, MBR$_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n\text{-}bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as cell$_i$. In accordance with one embodiment of the present invention, and assuming that the measured bit rate is MBR$_i$ when the i:th cell is transmitted to the network, the priority level (PL$_i$) of cell$_i$ may be calculated using the following equation:

$$x = 4.5 + \frac{\ln(MBR_i / NBR)}{\ln(2)} \quad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, $\subset x \rfloor$ represents the integer part of x. The present invention provides for the determination of cell priority levels (PL$_i$) using a buffer-based cell measurement and priority level assignment technique.

As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\subset x \rfloor$ represents the integer part of x, if 1<x<7.

It can be seen by application of Equation [1] above that if a connection is exploiting network capacity in excess to the connection's negotiated NBR value, the priority level of cell$_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes$_j$ identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 4, there is illustrated in flow diagram form a general methodology by which a network node processes cells containing priority level information received from a UNI in accordance with one embodiment of the present invention. FIG. 5 illustrates an embodiment of various components of a network node employed to effectuate the methodology illustrated in FIG. 4. It is assumed that a cell, such as cell$_i$, has been processed at a UNI and includes priority level information derived in a manner described hereinabove.

Cell$_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level (PL$_a$) based on the occupancy state of the memory 90. In general, the memory manager 89 establishes a high allowable priority which translates to a low allowable priority "level," for example PL$_a$=0 or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example PL$_a$=6 or 7. As will be appreciated by those skilled in the art, the calculation of PL$_a$ could alternatively be based on unoccupied buffer capacity rather than on buffer occupancy without departing from the spirit of the invention.

If the priority level of cell$_i$ is greater than the allowable priority level, PL$_a$, as determined 83 by the memory manager 89, the filter 88 discards 84 cell$_i$. If, on the other hand, the priority level of cell$_i$ is equal to or less than the allowable priority level PL$_a$, the filter 88 accepts 85 cell$_i$. The memory manager 89 coordinates the transfer 86 of cell$_i$ to the memory 90 and updates an index table 91 coupled to the memory manager 89 to include a new index table entry for newly accepted cell$_i$. In one embodiment, the index table 91 stores the location of the accepted cell$_i$ in the memory 90, and also stores a cell-type indicator which specifies whether cell$_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 6:
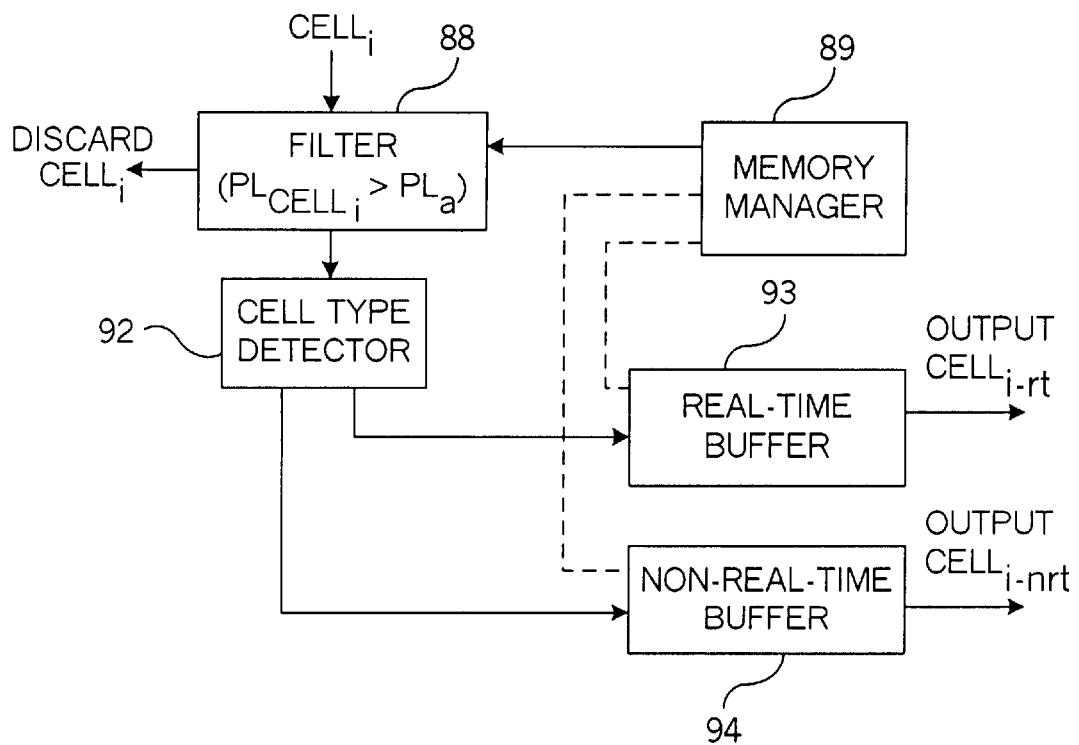
FIG. 6 is a block diagram of an alternative embodiment of a system for filtering cells at a network node in accordance with a nominal bit rate service.

As illustrated in FIG. 6, a memory manager 89 can determine the status of a real-time buffer (rt-buffer) 93 and a non-real-time buffer (nrt-buffer) 94. The memory manager 89 determines, in a manner similar to that previously described, the allowable priority level, $PL_a$, for the filter 88 based on the status of the rt-buffer 93 and the nrt-buffer 94. If the priority level of $cell_i$ is greater than the allowable priority level, $PL_a$ the filter 88 discards $cell_i$. If, on the other hand, the priority level of $cell_i$ is equal to or less than the allowable priority level, $PL_a$, $cell_i$ is accepted.

The network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

It may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

While a SIMA network as described above has many advantages and benefits, there may be occasions where it is desirable that the particular priority level, or drop preference, be overridden. One such occasion is where a multicast transmission is provided from a source to multiple users. Using the general priority scheme of a SIMA network, each of the branches of the multicast transmission may or may not receive the multicast transmission, based on the congestion of each particular connection. However, it may be desirable to ensure a more comparable quality of service to each of the receivers of a multicast transmission. In this case, the individual cell acceptance/rejection parameters may be overridden to provide a more equalized quality of service. The present invention provides for this opportunity.

Figure 7:
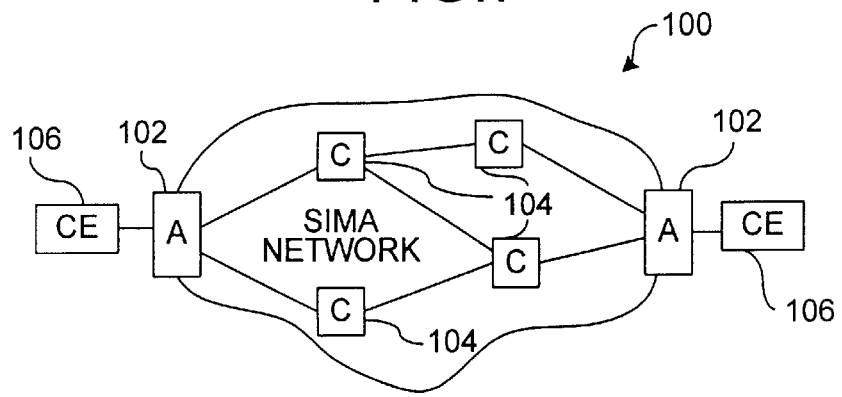
FIG. 7 is a block diagram illustrating a SIMA network including access nodes and core nodes.

FIG. 7 is a block diagram illustrating a SIMA network 100 implementing access nodes 102 and core nodes 104. A typical implementation of a SIMA service utilizes two primary components: access nodes (A) 102 and core network nodes (C) 104, which have fundamentally different functional responsibilities. For example, access nodes 102, which may be a user/network interface, perform the tasks of measuring traffic for every connection, and determining a cell or packet priority based on a ratio of the momentary actual bit rate (MBR) of the source to the nominal bit rate (NBR) assigned to the source. SIMA network core nodes 104 forward the SIMA packets from input to output(s), and make decisions regarding the acceptance and rejection of packets based on the priority of a packet and the occupancy levels of the buffers in the particular core node 104. The core nodes, therefore, do not need to obtain information regarding the properties of individual connections. The customer equipment (CE) 106 is connected to other customer equipment through the SIMA network 100 via the access nodes 102 and core nodes 104.

Figure 8:
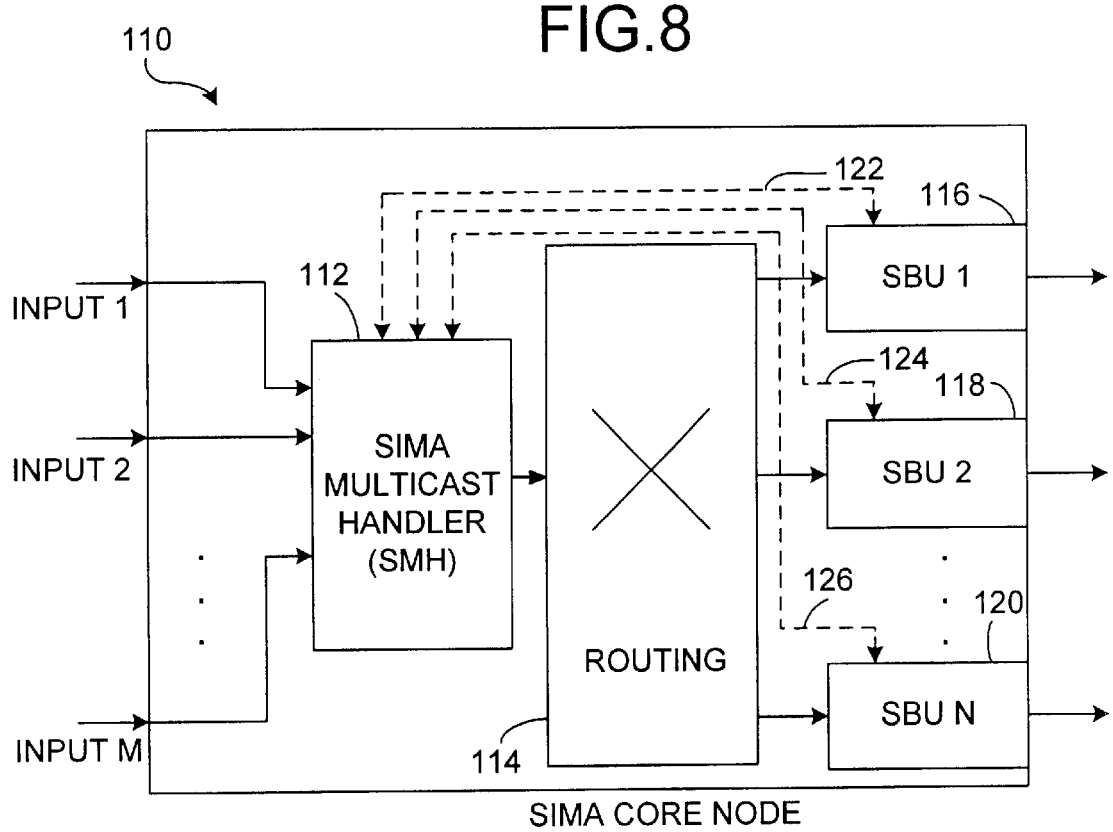
FIG. 8 is a block diagram illustrating a core node in a SIMA network incorporating a multicast priority management module in accordance with the present invention.

FIG. 8 is a block diagram illustrating a core node 110 in a SIMA network incorporating a multicast priority management module in accordance with the present invention. In the example of FIG. 8, the multicast priority management module is represented by the SIMA Multicast Handler (SMH) 112. In a typical SIMA network that does not employ multicast priority management, a packet received by the core node 110 is provided directly to a routing module, depicted by router 114. In such a case, all inputs, labeled input-1, input-2 through input-M are coupled directly to the router 114 to be routed to their corresponding scheduling and buffering unit, labeled SBU-1 116, SBU-2 118 through SBU-N 120. As will be described in greater detail in connection with FIG. 9, the scheduling and buffering units make decisions as to whether a particular packet will be accepted or discarded based on the current accepted priority level at the core node 110.

For purposes of clarity, the forthcoming description refers to the concept of packet "drop preference". The packet priority level may also be viewed in terms of its current "drop preference", as a packet having a high priority is less likely to be discarded, or "dropped" from the transmission stream. As applied to an NBR system, where a packet is transmitted at the nominal bit rate and receives a medium priority or drop preference (e.g., 4), a doubling of the transmission rate will result in a decrease by one (e.g., 3) of the priority or drop preference. In other words, a lower drop preference associated with a packet indicates that it is more likely to be dropped from the transmission stream than a packet having a higher drop preference. The drop preference (DP) of the packet indicates the relative priority, or drop preference, of the packet itself, where the allowed drop preference ($DP_a$) refers to the allowed drop preference at a given cell scheduling and buffering unit (SBU).

The present invention includes the provision of multicast priority management functionality. In FIG. 8, the SMH 112 intercepts the inputs to the core node 110 prior to reaching the router 114. The SMH 112 is used in SIMA core nodes to make decisions concerning the acceptance or rejection of multicast packets prior to the delivery of the packet to the individual SBUs. This allows a similar quality of service of multicast transmissions to be provided to all receivers of the multicast transmission.

The SMH 112 is able to distinguish between multicast and non-multicast packets. In one embodiment of the invention, the packet itself contains a special indication or flag identifying the packet as a multicast packet. The SMH 112 extracts the special indication from the packet by knowing its byte/bit location within the packet. The special indication or flag identifies the packet as a multicast or non-multicast packet. In another embodiment of the invention, the SMH 112 distinguishes between multicast and non-multicast packets by identifying packets belonging to a certain flow. For example, the SMH 112 can analyze the source IP (internet protocol) address or port in the header of an IP packet, and can determine whether the transmission is a multicast transmission based on the source of the packet flow. If the packet is not a multicast packet, it simply bypasses any additional functionality in the SMH 112, and is passed to the router 114.

When a packet has been identified as a multicast transmission packet, the SMH 112 will determine whether or not the packet should be accepted or discarded prior to input into the router 114. The decision as to whether to accept or discard the packet is a function of the congestion at some or all of the SBUs 116, 118 through 120. The SMH is therefore coupled to the SBUs such that it can receive the allowed or accepted drop preference ($DP_a$) values from each of the SBUs, as seen by communication lines 122, 124 through 126. As is described more fully below, the function may be based on the buffer occupancy levels of some or all of the SBUs, or may be based on the allowed drop preference value of some or all of the SBUs. It is preferable to take into account the buffer occupancy levels and/or drop preferences from as many SBUs as possible to that a similar quality of service can be provided for all connections. If the packet is to be discarded, it may be discarded immediately by the SMH 112, or individual SBUs may be informed to discard the packet. However, it is most efficient for the SMH 112 to discard the packets directly.

Figure 9:
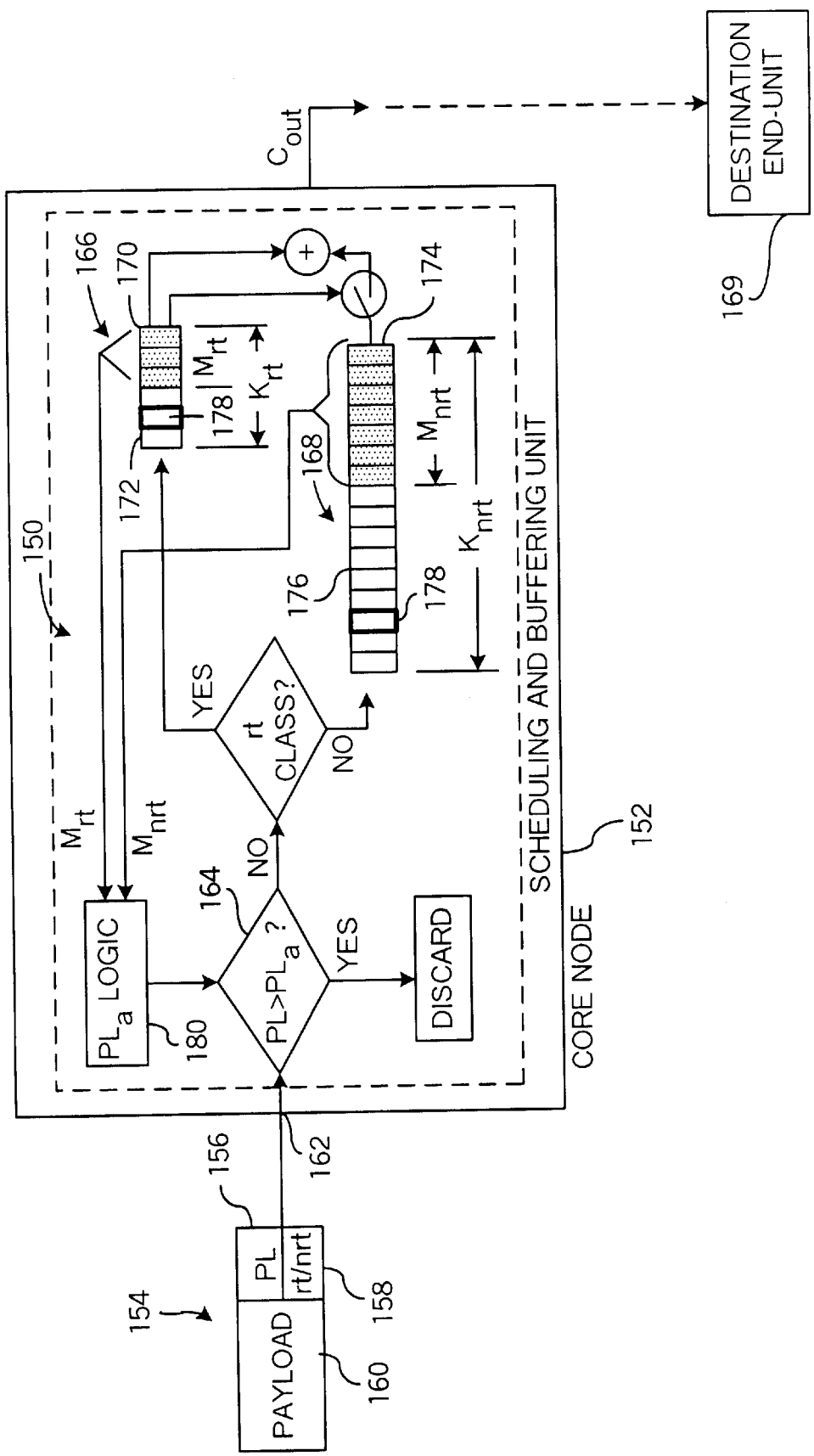
FIG. 9 is a block diagram of one embodiment of a cell scheduling and buffering unit (SBU) in accordance with the present invention.

As previously indicated, the cell scheduling and buffering units (SBUs) make decisions as to whether a particular packet will be accepted or discarded based on the current accepted priority level at the core node, and further provide buffering for real-time and non-real time cells. Referring now to FIG. 9, there is illustrated a diagram of a cell scheduling and buffering unit (SBU) 150 in accordance with one embodiment of the present invention. As described hereinabove, each cell received at a core node 152 has associated with it a priority level previously established based on traffic conditions at a source user/network interface, such as UNI 24 described in connection with FIG. 2. In addition, each cell has associated with it a service class indicator which identifies the cell as containing real-time or non-real-time payload. The cell scheduling and buffering unit 150 provides for efficient processing of both real-time and non-real-time cells based solely on two external considerations: the priority level (i.e., drop preference) and the service class status of each cell.

As is illustrated in FIG. 9, a cell, such as cell 154 includes a priority level (PL) 156, a real-time/non-real-time (rt/nrt) indicator 158, and a payload 160. The cell$_i$ 154 is received at an input 162 of the cell scheduling and buffering unit 150. A cell filter 164 determines the priority level of cell$_i$ 154 by reading the priority level bits PL 156 of the cell header. As part of the cell filtering procedure, the allowable priority level, $PL_a$, is computed based on the current status of typically two buffers provided in the cell scheduling and buffering unit 150.

In accordance with one embodiment of the SBU 150, two buffers, a real-time buffer 166 and a non-real-time buffer 168 are included. The occupancy level of the two buffers 166, 168 is computed by determining the number of cells currently residing in the rt-buffer 166, denoted $M_{rt}$, and the number of cells currently residing in the nrt-buffer 168, denoted $M_{nrt}$. The cells are buffered prior to being output from the node 152 to the destination end-unit 169.

It is noted that the shaded portion of the rt-buffer 166 represents an occupied rt-buffer portion 170, while the unshaded section represents an unoccupied rt-buffer portion 172. Similarly, an occupied nrt-buffer portion 174 of the nrt-buffer 168 is indicated by the shaded region, whereas the unshaded region represents an unoccupied nrt-buffer portion 176. It is further noted that each of the buffers 166, 168 include a number of buffer locations 178, and that the number of non-real-time buffer locations defining the nrt-buffer 168 typically exceeds the number of buffer locations defining the rt-buffer 166.

For purposes of illustration, and not of limitation, the following buffer parameters are defined:

$M_{rt}$ = the number of cells in the rt-buffer 166

$K_{rt}$ = the number of buffer places in the rt-buffer 166

$M_{nrt}$ = the number of cells in the nrt-buffer 168

$K_{nrt}$ = the number of buffer places in nrt-buffer 168

A processor, represented as $PL_a$ logic 180, determines the number of cells currently occupying the rt-buffer 166 ($M_{rt}$) and the number of cells currently occupying the nrt-buffer 168 ($M_{nrt}$). The processor 180 also determines the number of buffer locations 178 defining the rt-buffer 166 ($K_{rt}$) and the number of buffer locations 178 defining the nrt-buffer 168 ($K_{nrt}$). The occupancy levels of the rt-buffer 166 ($x_{rt}$) and the nrt-buffer 168 ($x_{nrt}$) are respectively determined using Equations [2] and [3] below:

$$x_{rt} = M_{rt}/K_{rt}$$

$$x_{nrt} = M_{nrt}/K_{nrt} \qquad [2/3]$$

The average occupancy level of the total buffering system (x) is then determined by one of several ways, including, for example, by use of any of the following equations:

$$x = (x_{rt} + x_{nrt}) \quad (a)$$

$$x = \sqrt{x^2_{rt} + x^2_{nrt}} \quad (b)$$

$$x = \max(x_{rt}, x_{nrt}) \quad (c) \qquad [4(a)/(b)/(c)]$$

The priority level PL 156 of cell$_i$ 154 ($PL_{cell-i}$) is compared to the result produced from use of the following equation:

$$PL < a - bx \qquad [5]$$

where, a and b are constants, and it is assumed for purposes of this example that a=b=9. Cell$_i$ 154 is accepted or discarded depending on the result of the comparison performed using Equation [5] above.

It may be advantageous to determine the allowable priority level, $PL_a$, using an alternative approach. Initially, it is assumed that the occupancy level of the rt-buffer 166, $X_{rt}$, and that of the nrt-buffer 168, $x_{rt}$, are divided into N levels, where N may be, for example, 16 or 12. For purposes of illustration, Table 1 provided below assumes that the occupancy level of the two buffers 166, 168 are divided into N=12 levels. When a cell arrives at the cell scheduling and buffering unit 150, the scheduling processor 180 determines the current values of $M_{rt}$ and $M_{nrt}$. By use of a simple calculation, especially if $K_{rt}$, $K_{nrt}$, and N are of the form $2^n$, an estimate of the current occupancy level of both buffers 166, 168 may be obtained. These two values, $x_{rt}$ and $x_{nrt}$, determine the rows and columns of Table 1. The contents of each cell of table 1 represents the highest allowed priority level, $PL_a$, in view of the current status of the two buffers 166, 168 upon arrival of $cell_i$ 154.

TABLE 1

| $\lfloor 12x_{nrt}\rfloor$ | \multicolumn{13}{c}{$\lfloor 12x_{rt}\rfloor$} |
| --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 |
| 0 | 7 | 7 | 7 | 7 | 6 | 6 | 5 | 4 | 3 | 2 | 1 | 0 | — |
| 1 | 7 | 7 | 7 | 7 | 6 | 6 | 5 | 4 | 3 | 2 | 1 | 0 | — |
| 2 | 7 | 7 | 7 | 6 | 6 | 6 | 5 | 4 | 3 | 2 | 1 | 0 | — |
| 3 | 7 | 7 | 6 | 6 | 6 | 5 | 5 | 4 | 3 | 2 | 1 | 0 | — |
| 4 | 6 | 6 | 6 | 6 | 5 | 5 | 4 | 4 | 3 | 2 | 1 | 0 | — |
| 5 | 6 | 6 | 6 | 5 | 5 | 4 | 4 | 3 | 3 | 2 | 1 | 0 | — |
| 6 | 5 | 5 | 5 | 5 | 4 | 4 | 3 | 3 | 2 | 2 | 1 | 0 | — |
| 7 | 4 | 4 | 4 | 4 | 4 | 3 | 3 | 2 | 2 | 1 | 1 | 0 | — |
| 8 | 3 | 3 | 3 | 3 | 3 | 3 | 2 | 2 | 1 | 1 | 0 | 0 | — |
| 9 | 2 | 2 | 2 | 2 | 2 | 2 | 2 | 1 | 1 | 0 | 0 | 0 | — |
| 10 | 1 | 1 | 1 | 1 | 1 | 1 | 1 | 1 | 0 | 0 | 0 | 0 | — |
| 11 | 0 | 0 | 0 | 0 | 0 | 0 | 0 | 0 | 0 | 0 | 0 | 0 | — |
| 12 | — | — | — | — | — | — | — | — | — | — | — | — | — |

It can be seen that Table 1 provides a useful estimate of the highest allowed priority level, $PL_a$, which reflects both the status and the relative sizes of the rt-buffer 166 and the nrt-buffer 168. An array of the values of Table 1 may be stored and updated as needed in non-volatile memory within the node 152.

Figure 10:
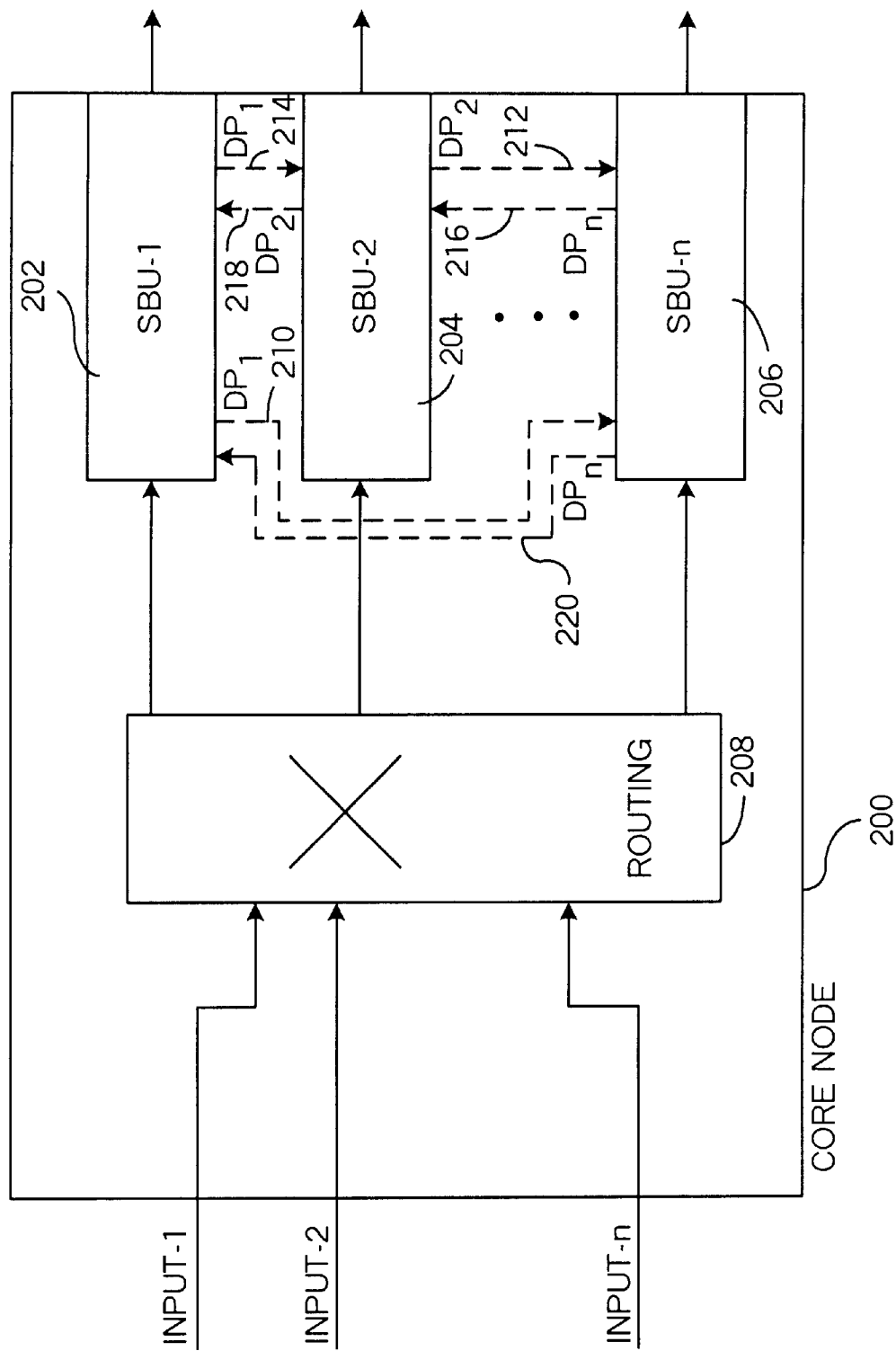
FIG. 10 is a block diagram illustrating a core node in a SIMA network incorporating a distributed multicast priority management functionality in accordance with the present invention.

FIG. 10 illustrates another embodiment of a core node 200 in a SIMA network incorporating a multicast priority management functionality in accordance with the present invention. In the example of FIG. 10, the multicast priority management function is distributed among the SBUs 202, 204 through 206. Similar to the core node 110 of FIG. 8, a packet is received by the core node 200. In this embodiment, the packet is provided directly to the routing module 208, and all inputs, labeled input-1, input-2 through input-M, are coupled directly to the router 208 to be routed to their corresponding scheduling and buffering unit 202, 204 through 206. In this embodiment, the scheduling and buffering units not only make packet acceptance decisions, but also perform a distributed multicast priority management function.

In this example, it is possible to use the allowed drop preference values ($DP_a$) of other SBUs in the decision-making of a particular SBU. The multicast priority management function is therefore distributed throughout the existing SBUs in the core node. For example, the allowed drop preference values $DP_1$ and $DP_2$ from SBU-1 202 and SBU-2 204 are provided to SBU-n 206 as shown on lines 210 and 212 respectively. Similarly, the allowed drop preference values $DP_1$ and $DP_n$ from SBU-1 202 and SBU-n 206 are provided to SBU-2 204 as shown on lines 214 and 216 respectively. Finally, the allowed drop preference values $DP_2$ and $DP_n$ from SBU-2 204 and SBU-n 206 are provided to SBU-1 202 as respectively shown on lines 218 and 220. The analysis of the allowed drop preference values is performed in each of the SBUs in a similar manner to the allowed drop preference analysis which would be provided by a distinct SIMA multicast handler such as the SMH 112 of FIG. 8. The analysis of such allowed drop preference values is described in greater detail in connection with the description of FIG. 14.

Figure 11:
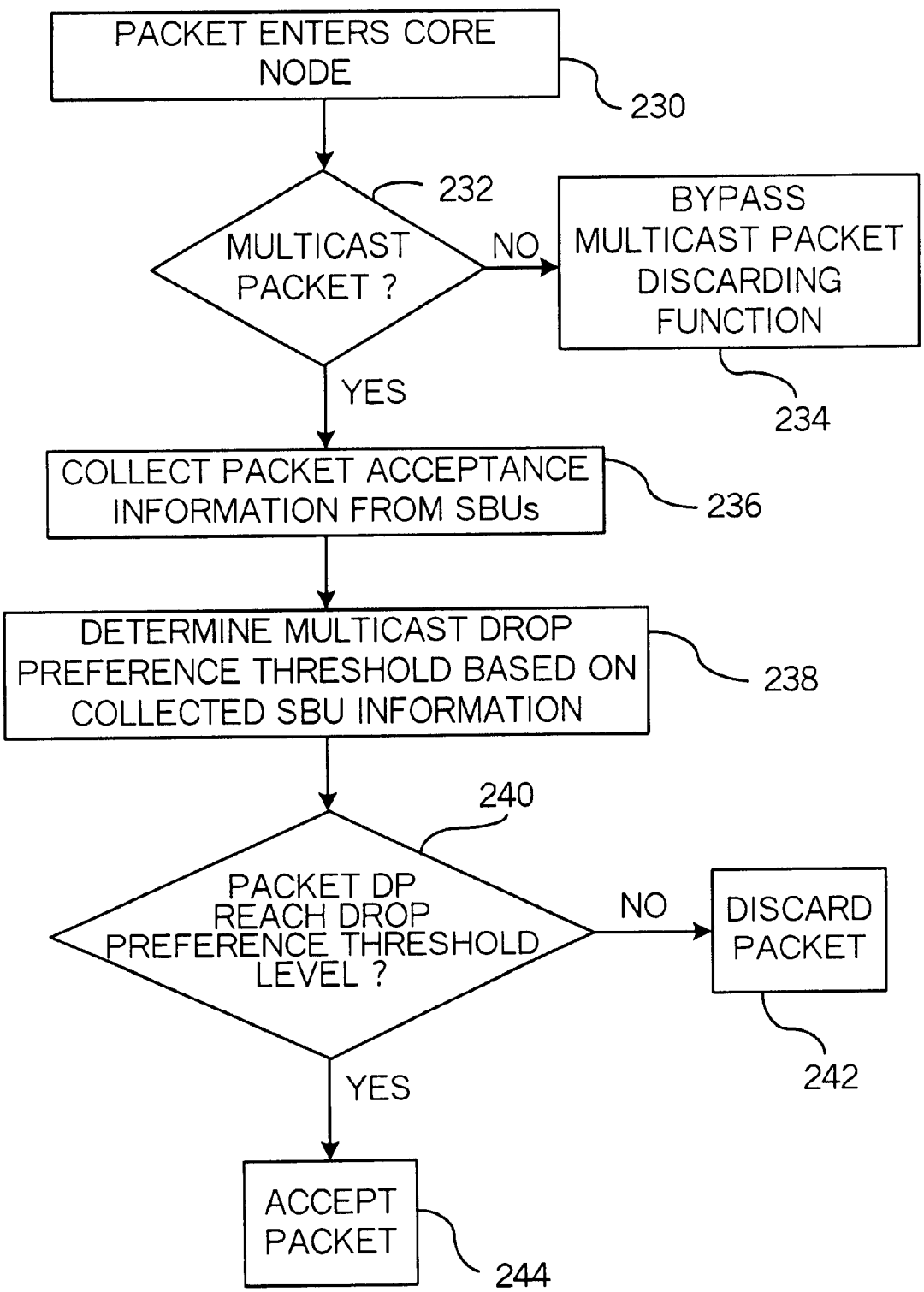
FIG. 11 is a flow diagram of one manner in which the multicast priority management function is carried out in accordance with the present invention.

FIG. 11 is a flow diagram of one manner in which the multicast priority management function is carried out in accordance with the present invention. A source transmits a cell/packet that is directed to a core node where it is input 230 to the core node. It is determined 232 whether the packet is a multicast packet. As previously described, this can be accomplished by incorporating a special indication or flag in the multicast packet that identifies the packet as a multicast packet. Alternatively, this can be accomplished by identifying packets belonging to a certain flow by determining the source of the packet. The source of the packet can be identified by its source IP (internet protocol) address or port in the header of an IP packet, for example. As will be readily apparent to those skilled in the art from the foregoing description, other multicast packet identification bits could alternatively be monitored to determine whether a packet is a multicast packet or not.

If the packet is determined 232 not to be a multicast packet, the packet acceptance/rejection function of the SIMA multicast handler is bypassed 234. The non-multicast packets are forwarded to the routing module and on to the respective cell scheduling and buffering units for individual packet acceptance analysis.

If it is determined 232 that the packet is a multicast packet, the allowed drop preference ($DP_a$) information is collected 236 from each of the SBUs in the core node. A multicast drop preference based on the collected $DP_a$ values from the SBUs is calculated at block 238. This multicast drop preference, labeled $DP_{SMF}$, indicates the accepted drop preference value at the SIMA multicast handler which is a function of the individual accepted drop preferences of the individual SBUs. Various manners of determining the multicast drop preference are described in connection with FIG. 14.

Figure 12:
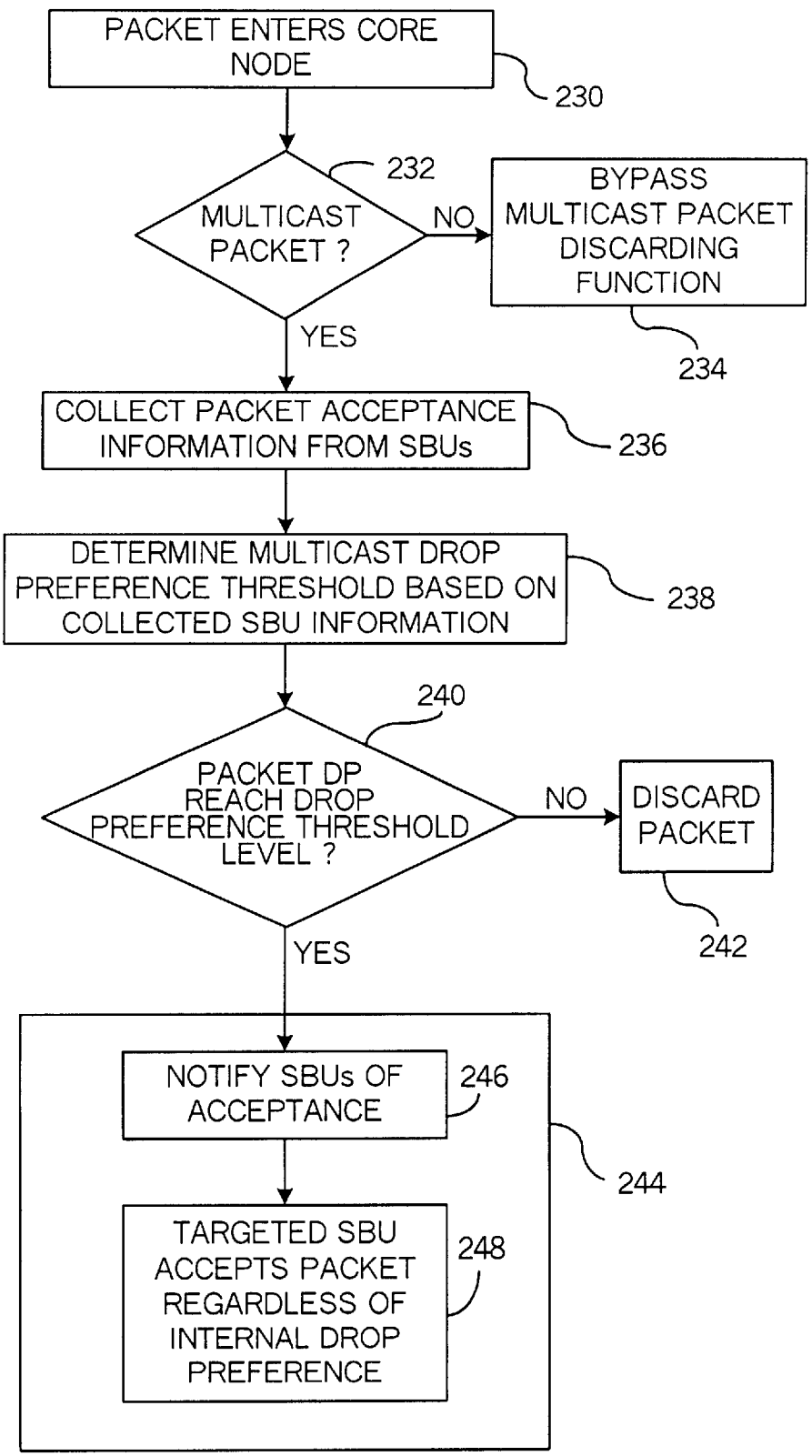
FIGS. 12 and 13 are flow diagrams illustrating embodiments in which a multicast packet accepted by the multicast priority management module is handled by the individual scheduling and buffering units.
Figure 13:
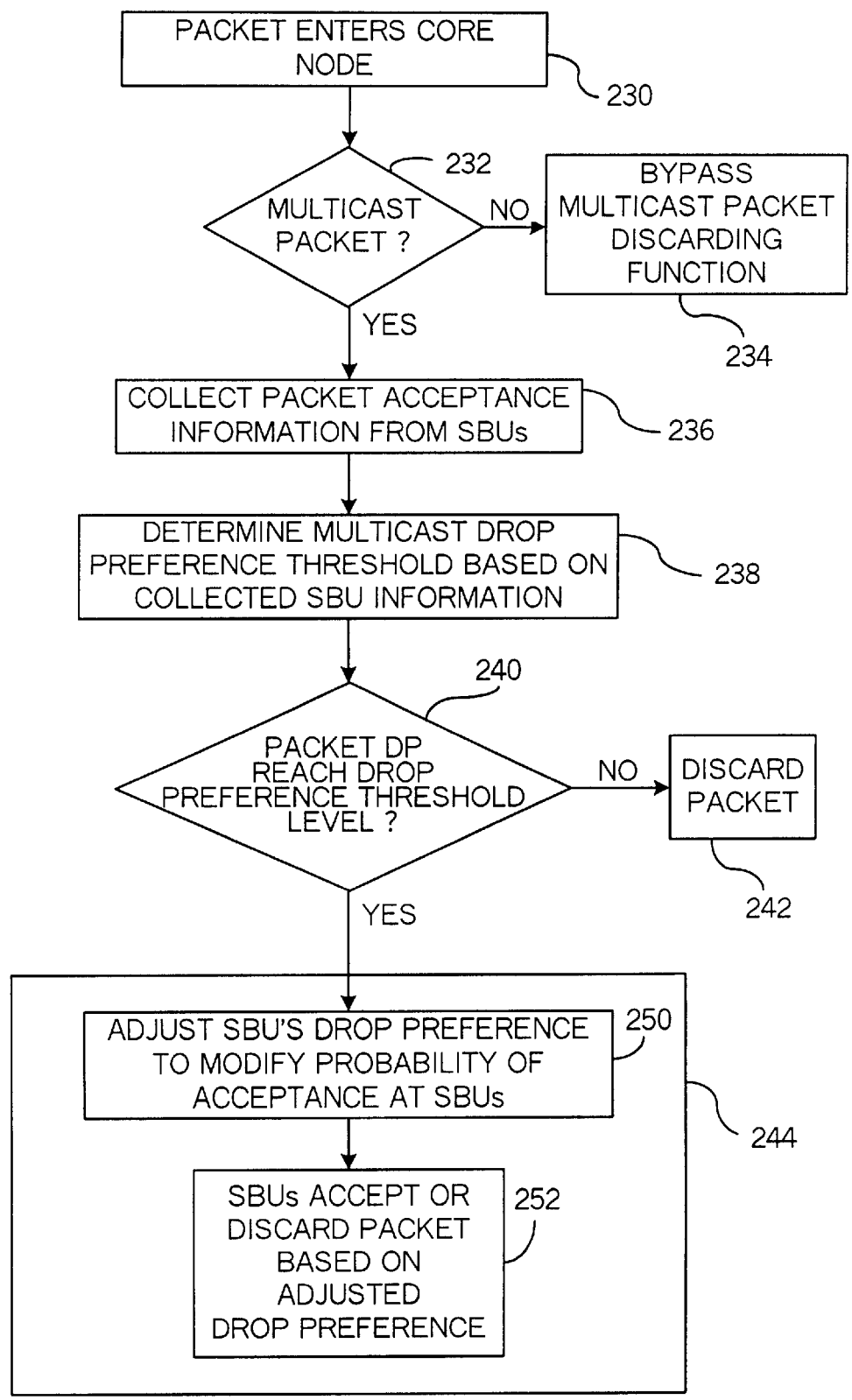

When the $DP_{SMH}$ has been determined, a comparison is made between the calculated $DP_{SMH}$ and the incoming DP of the incoming multicast packets, and it is determined whether the packet DP is high enough to be accepted at the SMH as seen at block 240. If the packet DP is not equal to or greater than $DP_{SMH}$, the packet is discarded 242. Otherwise, the packet is accepted 244 at the SMH.

Where a multicast packet is accepted by the SIMA multicast handler, there are various possibilities as to how the individual SBUs will be directed to handle the multicast packets. FIGS. 12 and 13 are flow diagrams illustrating two manners in which packets accepted by the SMH are managed by the individual cell scheduling and buffering units.

Referring to FIG. 12, the packet enters the core node 230 where it is determined 232 whether the packet is a multicast packet, and if so, SBU drop preference information is collected 236 and a multicast drop preference at the SMH is determined 238 from which it can be determined 240 whether the packet will be accepted 244. This is analogous to the embodiment illustrated in FIG. 11, and like reference numbers are used where applicable. However, the embodiment of FIG. 12 describes a particular manner in which the multicast packet can be accepted. When it has been determined 240 that the packet will be accepted 244, the SMH notifies 246 the individual SBUs that the SMH accepted the multicast packet. The SMH therefore explicitly enables all of the individual SBUs, so that the SBU targeted by the router will accept the packet. In this case, the SMH should not accept a packet if even one of the SBUs has a full buffer. The targeted SBU will accept 248 the packet under these circumstances, regardless of its own allowed drop preference.

Referring now to FIG. 13, another embodiment of the manner in which the multicast packet can be accepted is described. When it has been determined 240 that the packet will be accepted 244, the SMH adjusts 250 each of the SBU's drop preferences to modify the probability of acceptance at the SBUs. In other words, the individual SBUs may accept or reject packets at different allowed drop preferences depending on whether the packet is a multicast packet or not. For example, the SMH may determine that the multicast packet should be accepted, and will in turn direct each of the individual SBUs to lower their allowed drop preference to increase the likelihood that the packets will be accepted at the individual SBUs. The allowed drop preference, $DP_a$, is calculated at the individual SBUs upon the arrival of a packet, but is modified by an amount G, which represents the gain due to the multicast nature of the packet. Thus, the multicast packet will be accepted at an individual SBU if:

$$DP \geq DP_a - G \quad [6]$$

where DP is the drop preference of the multicast packet, $DP_a$ is the allowed drop preference of the SBU, and G is the adjustment requested by the SMH to modify the likelihood of acceptance at the SBU. In general, the probability that the multicast packet is accepted by the SBUs will be increased, as the SBUs will accept or discard the packet based on the adjusted drop priority as shown at block 252. For example, if the SMH determines that the likelihood of acceptance at the SBUs should be increased by 2 (i.e., G=2), and the allowed drop preference at a given SBU is 4 (i.e., $DP_a$=4), then multicast packets having a drop preference of 2 (i.e., DP=2) will be accepted at the SBU (i.e., 2≧4−2).

Figure 14:
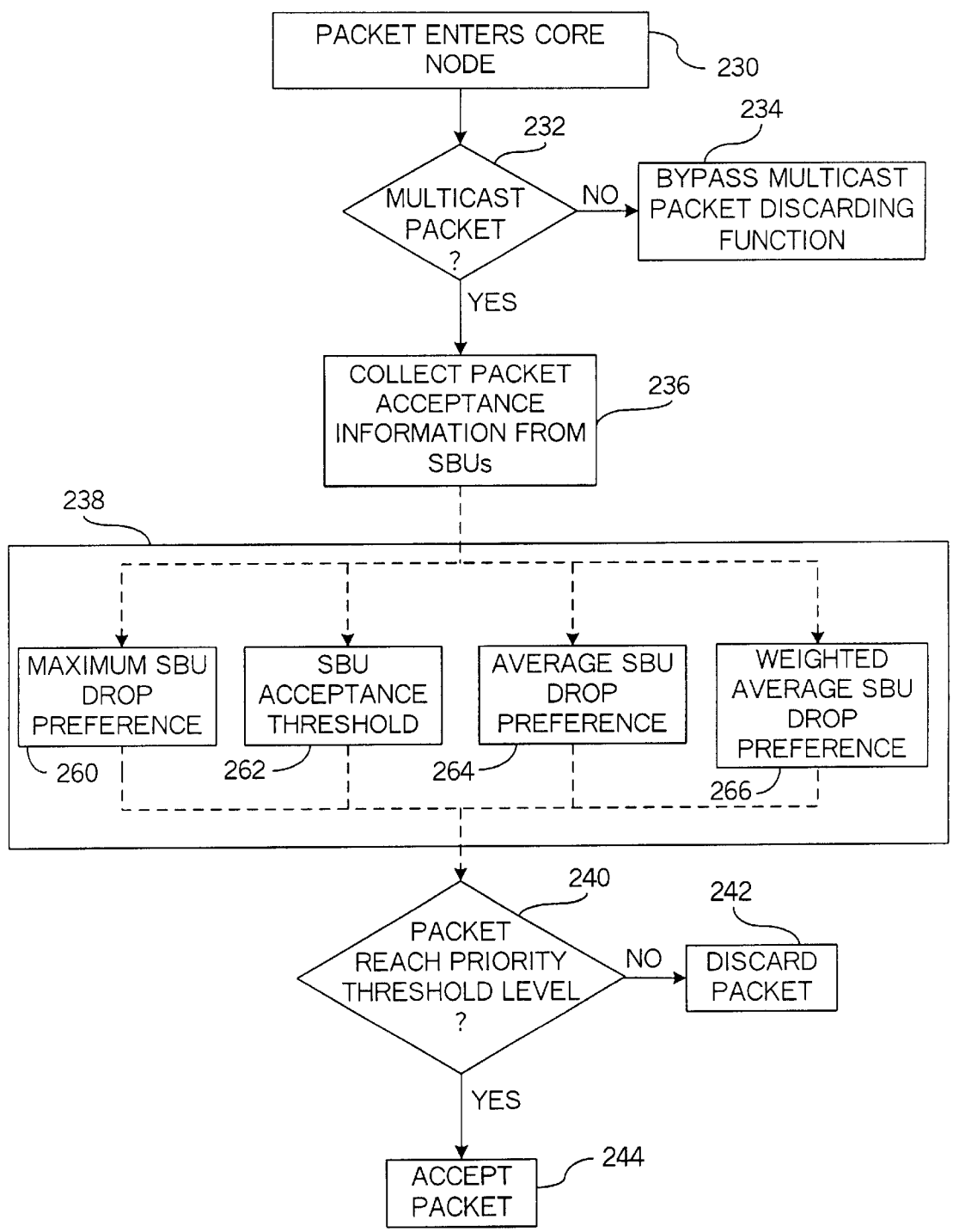
FIG. 14 is a flow diagram illustrating various embodiments of the invention in which the multicast drop preference is determined using the collected SBU allowed drop preference information.

FIG. 14 is a flow diagram illustrating various embodiments of the invention in which the multicast drop preference is determined using the collected SBU allowed drop preference information. The packet enters the core node 230 where it is determined 232 whether the packet is a multicast packet, and if so, SBU drop preference information is collected 236 and a multicast drop preference at the SMH is determined 238 from which it can be determined 240 whether the packet will be discarded 242 or accepted 244. FIG. 14 illustrates various embodiments in which the SMH determines 238 the multicast drop preference.

The accepted drop preference in the SIMA multicast handler to be determined is designated as $DP_{SMH}$. Let the occupancy level of the non-real-time buffer of SBU number j be $Mj_{nrt}$, and the occupancy level of the real-time buffer of SBU number j be $Mj_{rt}$. Then we have:

$$DP_{SMH} = f(M_{nrt}^1, M_{rt}^1, M_{nrt}^2, M_{rt}^2, \ldots, M_{nrt}^N, M_{rt}^N) \quad [7]$$

where N is the number of multicast packets (N is equal to or greater than 2) and $f$ represents a function of those variables.

Equation [7] implies that it is not necessary to calculate the usual $DP_a^i$ value first. However, in many cases it is more convenient to first calculate the normal, independent $DP_a$ values in the SBUs, and to use this information in Equation [7]. In this case, Equation [7] can be written as:

$$DP_{SMH} = f(DP_a^1(M_{nrt}^1, M_{rt}^1), DP_a^2(M_{nrt}^2, M_{rt}^2), \ldots, DP_a^N(M_{nrt}^N, M_{rt}^N)) \quad [8]$$

or alternatively, $$DP_{SMH} = f(DP_a^1, DP_a^2, \ldots, DP_a^N) \quad [9]$$

where $DP_a^i$ refers to the independent $DP_a$ calculated in SBU number i.

After the SMH has calculated $DP_{SMH}$, the multicast packet will be accepted at the SMH if the multicast packet drop preference DP is greater than or equal to $DP_{SMH}$.

Referring again to FIG. 14, and using the notation described above, various embodiments in which the SMH determines 238 the multicast drop preference are illustrated. It should be understood that the following examples are illustrative in nature, and the invention should not to be limited thereto, as other embodiments may become readily apparent to those skilled in the art from the description provided herein without departing from the scope and spirit of the invention.

In a first embodiment, the maximum SBU allowed drop priority is determined 260. In this example, the multicast packet is accepted at the SMH if and only if it would have been accepted individually by all SBUs. This "all or nothing" approach requires that the multicast packet have a drop preference that is greater than or equal to all individual $DP_a$ values of the SBUs. Therefore, the accepted drop priority at the SMH is:

$$DP_{SMH} = MAX(DP_a^i) \quad [10]$$

where the index i represents each of the SBUs that are forwarding the multicast packet, and MAX is a function to select the maximum $DP_a^i$ value.

In another embodiment, it is determined 262 whether a predetermined number of SBUs currently have a particular allowed drop preference. In this case, every SBU calculates its individual $DP_a$ value, and if more than a predetermined number of SBUs would accept the multicast packet, then it is accepted at the SMH. If the SMH accepts the multicast packet in this fashion, then all of the SBUs are directed to accept the multicast packet, including those that would not accept the packet on an individual basis. For example, where ten SBUs targeted for a multicast transmission are analyzed, and it is required that at least seven of the SBUs have an individual $DP_a$ value of 4, all ten of the SBUs will be directed to accept the multicast packet if at least seven of the SBUs have an individual $DP_a$ value of 4.

In another embodiment, the average SBU drop preference is determined 264. In this example, the multicast packet is accepted at the SMH if the SMH determines that the average drop preference of the individual SBUs is greater than or equal to a predetermined average value. Therefore, if the DP of the multicast packet is greater than or equal to (rounded, truncated or otherwise made an integer value) this average value, then the multicast packet is accepted at the SMH, or otherwise discarded. This can be seen by Equation [11] below:

$$DP_{SMH} = \sum_{j=1}^{N} \frac{1}{N} DP_a^j \quad [11]$$

where the summation index j includes all of the SBUs involved in the multicasting.

In yet another embodiment, a weighted average SBU drop preference is determined 266. In this example, the multicast packet is accepted at the SMH if the SMH determines that the weighted average drop preference of the individual SBUs is greater than or equal to a predetermined value. In this case, the $DP_{SMH}$ is obtained by calculating a weighted average over the $DP_a$ values of different SBUs, as shown in Equation [12] below:

$$DP_{SMH} = \sum_{j=1}^{N} \frac{1}{w_j} DP_a^j \quad [12]$$

where $w_j$ is the weight assigned for SBU number j. For example, the capacity of the output links may have an effect on the weight assigned. Notice that when $w_j$=N for all j, Equation [12] is equivalent to average $DP_a$ value principle shown in Equation [11].

The SMH implements various arithmetic functions to determine the multicast drop preference. For example, in one embodiment of the invention, the SMH comprises a processing unit capable of performing arithmetic functions such as adding, subtracting and comparing. As is known to those skilled in the art, such a processing unit can calculate a maximum value given a number of values, as well as average values and weighted averages. The processing unit can also count a certain number of instances where a value is equal to or greater than a predetermined value. Alternatively, discrete components, such as comparators, adders or arithmetic logic units (ALUs) can be used.

Figure 15:
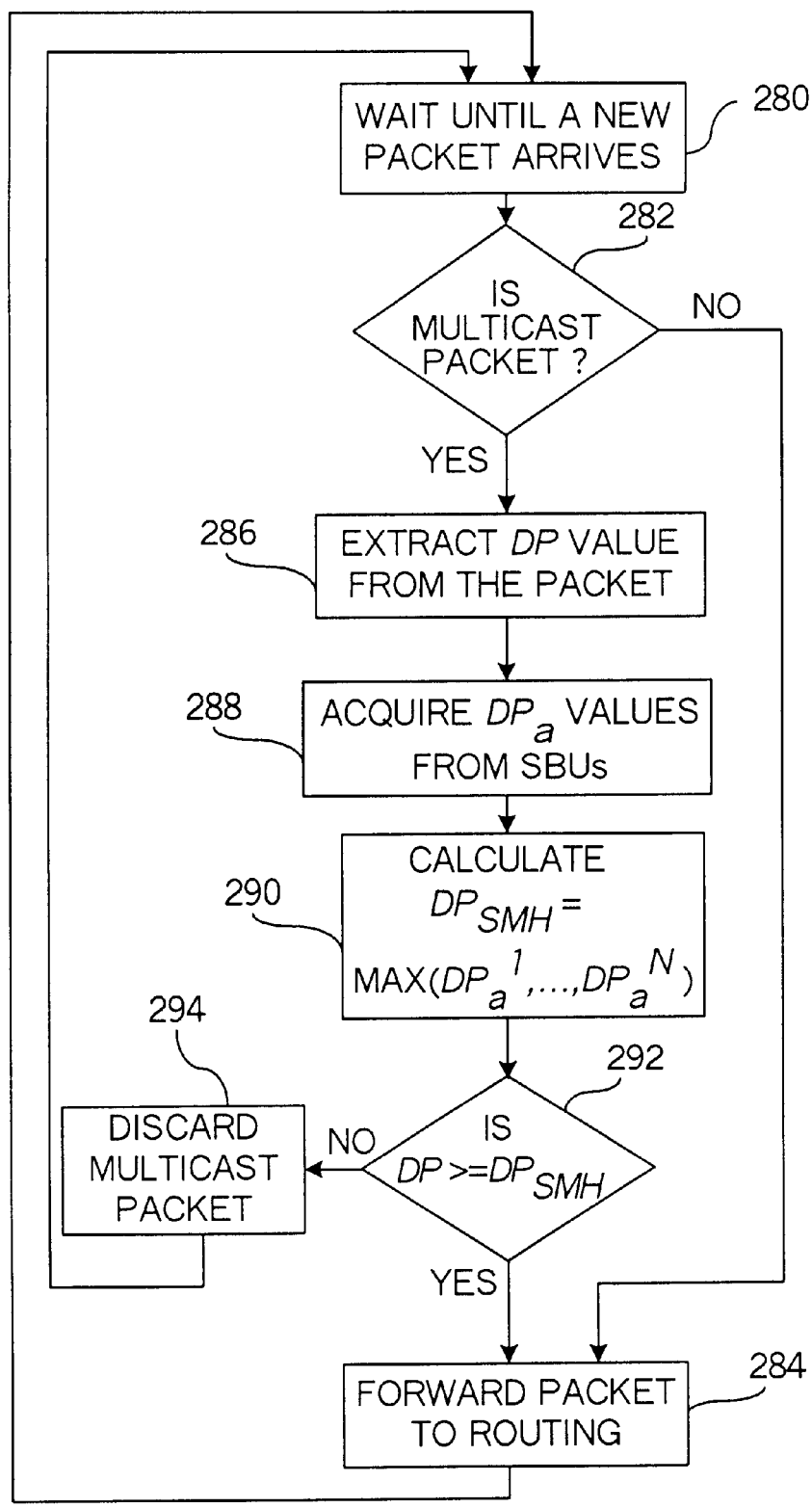
FIG. 15 is a flow diagram of an exemplary method in accordance with the present invention.

Referring now to FIG. 15, a flow diagram of one example embodiment of the invention is provided. In this example, it is assumed that multicast packets are detected based on the IP address of the source. It is also assumed that the decision-making function of the SMH is $$DP_{SMH} = \text{MAX}(DP_a^j),$$

as shown in Equation [10] above, so that the packet is accepted only if it would be accepted individually in all SBUs.

A packet is received 280, and it is determined 282 whether the packet is a multicast packet by analyzing the IP address of the source. If it is not a multicast packet, it is simply forwarded 284 to the routing unit and ultimately output from the appropriate SBU. If the packet is a multicast packet, the SMH extracts 286 the drop preference DP of the packet. The SMH acquires 288 the $DP_a$ values from all of the SBUs, and the maximum $DP_a$ value is selected 290 as $DP_{SMH}$. This is compared 292 against the multicast packet drop priority DP. If DP≧$DP_{SMH}$, the packet is accepted, and forwarded 284 to the routing unit. Otherwise, the multicast packet is discarded 294. In this particular example, an accepted packet may be simply forwarded to the routing unit and ultimately to the appropriate SBUs. There is no need to directly transfer information from the SMH to the SBUs, because the SMH will either discard the packet itself, or forward the packet. In the latter case, each SBU will receive the packet and place it into its buffer. Alternatively, it is possible to transmit notifying information from the SMH to the SBUs to instruct one or more SBUs to discard the packet.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. A method for overriding packet acceptance criteria established at each individual connection of a network node, to provide a collective packet acceptance criteria for each packet of a multicast transmission targeted for the individual connections, comprising:
   collecting the packet acceptance criteria from each of the individual connections in the network node that are targeted for the multicast transmission;
   calculating a multicast packet priority for each of the packets associated with the multicast transmission based on an aggregate analysis of the packet acceptance criteria of each of the individual connections;
   collectively accepting or discarding each of the packets associated with the multicast transmission based on the calculated multicast packet priority; and
   determining whether the packet is a packet associated with a multicast transmission, and bypassing the collecting of the packet acceptance criteria, bypassing the calculating of a multicast packet priority, and bypassing the collective accepting or discarding of each of the packets when the packet is not associated with the multicast transmission.

2. The method as in claim 1, wherein determining whether the packet is a multicast transmission packet comprises monitoring a multicast indicator in the packet header.

3. The method as in claim 1, wherein determining whether the packet is a multicast transmission packet comprises ascertaining the source of the packet to determine whether the source is a multicast transmission source.

4. The method as in claim 3, wherein ascertaining the source of the packet comprises comparing the source address from the packet header to predetermined addresses of multicast packet sources.

5. The method as in claim 1, wherein bypassing further comprises using the packet acceptance criteria established at each individual connection of the network node as a basis to individually accept or reject the packets not associated with the multicast transmission.

6. A method for overriding packet acceptance criteria established at each individual connection of a network node, to provide a collective packet acceptance criteria for each packet of a multicast transmission targeted for the individual connections, comprising:
   collecting the packet acceptance criteria from each of the individual connections in the network node that are targeted for the multicast transmission;
   calculating a multicast packet priority for each of the packets associated with the multicast transmission based on an aggregate analysis of the packet acceptance criteria of each of the individual connections;
   collectively accepting or discarding each of the packets associated with the multicast transmission based on the calculated multicast packet priority; and
   determining whether the packet is a packet associated with a multicast transmission, and bypassing the collecting of the packet acceptance criteria, bypassing the calculating of a multicast packet priority, and bypassing the collective accepting or discarding of each of the packets when the packet is not associated with the multicast transmission, wherein bypassing further comprises:
      using the packet acceptance criteria established at each individual connection of the network node as a basis to individually accept or reject the packets not associated with the multicast transmission.

7. The method as in claim 6, wherein determining whether the packet is a multicast transmission packet comprises monitoring a multicast indicator in the packet header.

8. The method as in claim 6, wherein determining whether the packet is a multicast transmission packet comprises ascertaining the source of the packet to determine whether the source is a multicast transmission source.

9. The method as in claim 8, wherein ascertaining the source of the packet comprises comparing the source address from the packet header to predetermined addresses of multicast packet sources.

10. A method for overriding packet acceptance criteria established at each individual connection of a network node, to provide a collective packet acceptance criteria for each packet of a multicast transmission targeted for the individual connections, comprising:

collecting the packet acceptance criteria from each of the individual connections in the network node that are targeted for the multicast transmission, wherein collecting the packet acceptance criteria from each of the individual connections comprises:

receiving an allowable packet priority corresponding to each of the individual connections, wherein the allowable packet priority represents a minimum packet priority necessary for acceptance;

calculating a multicast packet priority for each of the packets associated with the multicast transmission based on an aggregate analysis of the packet acceptance criteria of each of the individual connections;

modifying the packet acceptance criteria at each of the individual connections in the network node based on the calculated multicast packet priority, wherein modifying the packet acceptance criteria comprises:

increasing the allowable packet priorities of each of the individual connections to increase a likelihood of packet acceptance at each of the individual connections; and individually accepting or discarding each of the packets associated with the multicast transmission based on the modified packet acceptance criteria.

11. The method as in claim 10, wherein modifying the packet acceptance criteria comprises decreasing the allowable packet priorities of each of the individual connections to decrease a likelihood of packet acceptance at each of the individual connections.

12. The method as in claim 10, wherein modifying the packet acceptance criteria comprises increasing the allowable packet priorities of each of the individual connections to increase a likelihood of packet acceptance at each of the individual connections.

13. A method for overriding packet acceptance criteria established at each individual connection of a network node, to provide a collective packet acceptance criteria for each packet of a multicast transmission targeted for the individual connections, comprising:

collecting the packet acceptance criteria from each of the individual connections in the network node that are targeted for the multicast transmission, wherein collecting the packet acceptance criteria from each of the individual connections comprises:

receiving an allowable packet priority corresponding to each of the individual connections, wherein the allowable packet priority represents a minimum packet priority necessary for acceptance;

calculating a multicast packet priority for each of the packets associated with the multicast transmission based on an aggregate analysis of the packet acceptance criteria of each of the individual connections;

modifying the packet acceptance criteria at each of the individual connections in the network node based on the calculated multicast packet priority, wherein modifying the packet acceptance criteria comprises:

decreasing the allowable packet priorities of each of the individual connections to decrease a likelihood of packet acceptance at each of the individual connections; and individually accepting or discarding each of the packets associated with the multicast transmission based on the modified packet acceptance criteria.

* * * * *